Patented Dec. 29, 1942

2,306,681

UNITED STATES PATENT OFFICE 2,306,681

WATER-INSOLUBLE AZO DYESTUFFS

Werner Zerweck, Josef Riedmair, and Walter Brunner, Frankfort-on-the-Main-Fechenheim, Germany, assignors to General Aniline & Film Corporation, New York, N. Y., a corporation of Delaware No Drawing. Application January 7, 1941, Serial No. 373,434. In Germany January 24, 1940

4 Claims. (Cl. 260—153)

Our present invention relates to waterinsoluble azodyestuffs more particularly to those of the general formula:

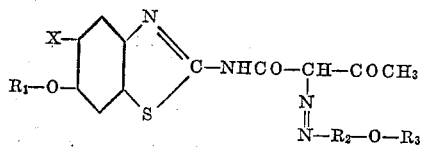

wherein the R's stand for radicles of the benzene series and X for a member of the group consisting of hydrogen, halogen, alkyl, alkoxy and aryloxy groups of the benzene series.

The present new azodyestuffs are special embodiments of the group of waterinsoluble azodyestuffs described and claimed in U. S. Patent No. 2,030,327. They are obtained by combining in substance or on a substratum the diazocompounds of amino arylethers of the benzene series with acetoacetylamino-beenzothiazole compounds containing in the 6-position of the benzthiazole radicle an aryloxy group of the benzene series.

The dyestuffs produced in substance are generally yellowish substances, suitable for preparing valuable color lakes, while those produced on the fiber, especially the cellulosic fiber, according to one of the usual dyeing or printing processes, generally yield yellow to reddish yellow to greenish yellow shades of good fastness properties. They are distinguished within the scope of U. S. Patent 2,030,327 by a particular brightness and strength of shades to such a degree as hitherto unknown for waterinsoluble yellow azodyestuffs.

In order to further illustrate our invention the following examples are given, the parts being by weight and all temperatures in degrees centigrade.

Example 1

8.9 parts of 2-acetoacetylamino-5-methoxy-6-phenoxybenzthiazol are mixed with about 20 parts of alcohol and dissolved in 25 parts of a caustic soda solution of 4% strength and 300 parts of water. Then while well stirring dilute acetic acid is dropped in until a slightly acid reaction, whereby the acetoacetyl compound separates in a finely divided form. After the addition of 70 parts of a dilute sodium acetate solution of 25% strength and 80 parts of technical pyridine at about 0 to 5° a diazosolution is slowly added, which has been prepared in the usual manner from 6.2 parts of 2-amino-4.6-dimethyl-5-chlorodiphenylether. The formed azodyestuff of the formula:

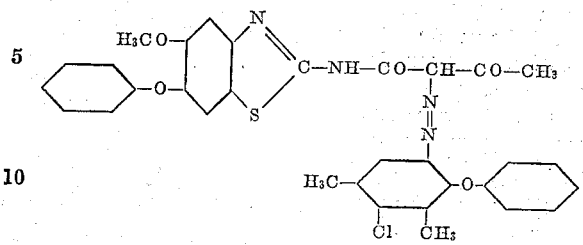

is filtered off and well washed with water. The paste thus obtained is digested with 30 parts of a caustic soda solution of 40° Bé. and about 1000 parts of water and after the addition of 9 parts of sodium hydrosulfite the mixture is warmed for some hours at about 70°. After isolation and drying the waterinsoluble azodyestuff is particularly suitable for the preparation of bright greenish color lakes.

Example 2

1 gr. of 2-acetoacetylamino-5-methoxy-6-phenoxybenzthiazol is dissolved in one liter of water with the addition of 3 ccms. of alcohol and 0.5 ccm. of a caustic soda solution of 38° Bé. 50 grs. of cotton yarn are impregnated with such a solution with the addition of sodium sulfate at about 30° and developed with a solution containing 1.5 grs. of diazotized 2-amino-4.4'-dichlorodiphenylether and an excess of sodium acetate, well rinsed and soaped. In this manner on the fiber the dyestuff of the formula:

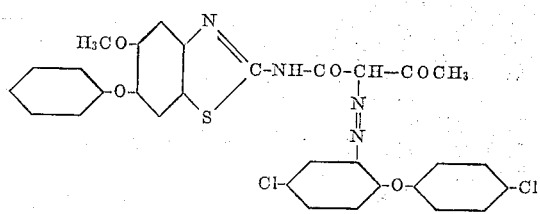

is produced, dyeing very clear and strong yellow shades of very good fastness properties.

Example 3

50 parts of a mixture consisting of 326 parts of 2-acetoacetylamino-6-phenoxybenzthiazol and 369.5 parts of diazoamino-compound obtained by coupling diazotized 2-amino-4.6-dimethyl-5-chlorodiphenylether with the sodium salt of the methylamino-acetic acid are dissolved with the addition of 50 parts of di-(oxethyl)-sulfide in 300 parts of a caustic soda solution of 38° Bé. and 320 parts of water. This solution is converted by mixing it with 500 parts of a neutral starch-tragacanth thickening into a paste form which is suitable for printing textile good, the tissue is printed therewith and the dyestuff of the formula:

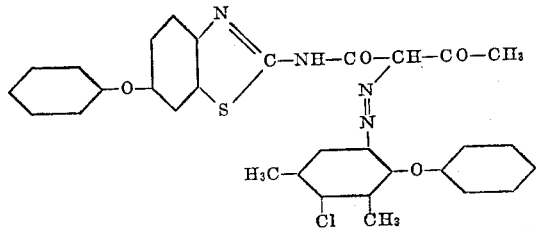

is developed in the usual manner by steaming in an acetic-formic-acid atmosphere. In this manner bright greenish yellow prints of good fastness properties are obtained.

A similar result is obtained when using the equivalent amount of 2-acetoacetylamino-5-methoxy-6-phenoxy-benzthiazol as coupling component.

In the following table these and some further dyestuffs produced according to our present invention are named:

yielding when produced in substance valuable bright greenish yellow color lakes and when produced on the fiber bright greenish yellow shades of good fastness properties.

2. The water insoluble azodyestuff of the formula:

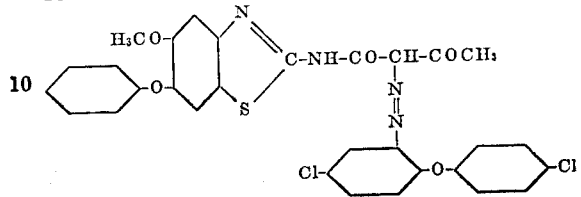

yielding when produced in substance valuable clear and strong yellow color lakes and when produced on the fiber clear and strong yellow shades of good fastness properties.

3. The water insoluble azodyestuff of the formula:

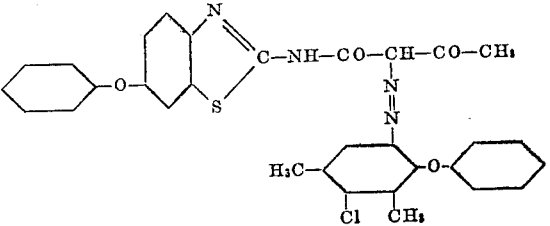

| Combining component | Diazo-component | Shade |
|---|---|---|
| 2-acetoacetylamino-5-methoxy-6-phenoxybenzthiazol. | 2-amino-4-chlorodiphenylether | Clear strong yellow. |
| Do | 2-amino-4,6-dimethyl-5-chlorodiphenylether | Very bright greenish yellow. |
| Do | 4-amino-2-chloro-5-methyl-diphenylether | Clear yellow. |
| Do | 4-amino-2,4'-dichloro-5-methyldiphenylether | Do. |
| Do | 4-amino-2-chloro-3-methoxydiphenylether | Do. |
| Do | 4-amino-2,4'-dichloro-3-methoxydiphenylether | Do. |
| Do | 4-amino-2,5-dimethyl-diphenylether | Strong greenish yellow. |
| Do | 2-amino-4,4'-dichloro-diphenylether | Strong clear yellow. |
| 2-acetoacetylamino-6-phenoxybenzthiazol. | | Do. |
| Do | 2-amino-4-chloro-diphenylether | Very bright greenish yellow. |
| Do | 4-amino-4,6-dimethyl-5-chlorodiphenylether | Clear greenish yellow. |
| Do | 4-amino-2-chloro-5-methyldiphenylether | Strong yellow. |
| Do | 4-amino-2,4'-dichloro-5-methyl-diphenyl-ether. | Very bright greenish yellow. |
| Do | 4-amino-2-chloro-3-methoxy-diphenyl-ether. | Do. |
| Do | 4-amino-2,4'-dichloro-3-methoxy-diphenyl-ether | Clear reddish yellow. |
| Do | 4-amino-2,5-dimethyldiphenylether | Clear yellow. |
| 2-acetoacetylamino-5-methoxy-6-o-chloro-phenoxy-benzthiazol. | 2-amino-4-chloro-diphenylether | Clear reddish yellow. |
| Do | 2-amino-4,4'-dichloro-diphenylether | Brilliant greenish yellow. |
| Do | 2-amino-4,6-dimethyl-5-chloro-diphenylether | Clear strong yellow. |
| 2-acetoacetylamino-5-methoxy-6-m-chloro-phenoxy-benzthiazol. | 2-amino-4-chloro-diphenylether | Do. |
| Do | 2-amino-4,4'-dichloro-diphenylether | Clear greenish yellow. |
| Do | 2-amino-4,6-dimethyl-5-chloro-diphenylether | Strong yellow. |
| 2-acetoacetylamino-5-methoxy-6-p-chloro-phenoxy-benzthiazol. | 2-amino-4-chlorodi-phenylether | Do. |
| Do | 2-amino-4,4'-dichloro-diphenylether | Brilliant greenish yellow. |
| 2-acetoacetylamino-6-o-chloro-phenoxy-benzthiazol. | 2-amino-4,6-dimethyl-5-chlorodiphenyl-ether | Do. |
| 2-acetoacetylamino-6-m-chloro-phenoxy-benzthiazol. | do | Do. |
| 2-acetoacetylamino-6-p-chloro-phenoxy-benzthiazol. | do | Do. |
| 2-acetoacetylamino-5-chloro-6-phenoxy-benzthiazol. | 2-amino-4-chloro-diphenylether | Clear reddish yellow. |
| 2-acetoacetylamino-5-methyl-6-phenoxy-benzthiazol. | do | Greenish yellow. |
| 2-acetoacetylamino-5,6-di-phenoxybenzthiazol. | 2-amino-4,6-dimethyl-5-chloro-di-phenyl-ether | |

We claim:

1. The water insoluble azodyestuff of the formula:

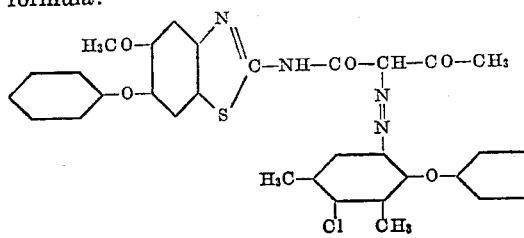

yielding when produced in substance valuable bright greenish yellow color lakes and when produced on the fiber bright greenish yellow shades of good fastness properties.

4. Water-insoluble azo dyestuffs of the general formula:

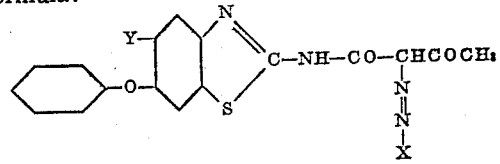

wherein Y is selected from the class consisting of hydrogen and methoxy and X is selected from the class consisting of
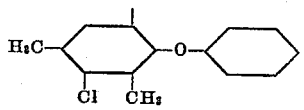
and
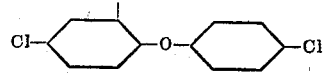
the bond in the latter radicles designating their point of attachment to the azo group.
WERNER ZERWECK.
JOSEF RIEDMAIR.
WALTER BRUNNER.